March 29, 1960  H. E. GLODDE  2,930,110
DETREADING MEANS
Filed Jan. 24, 1958
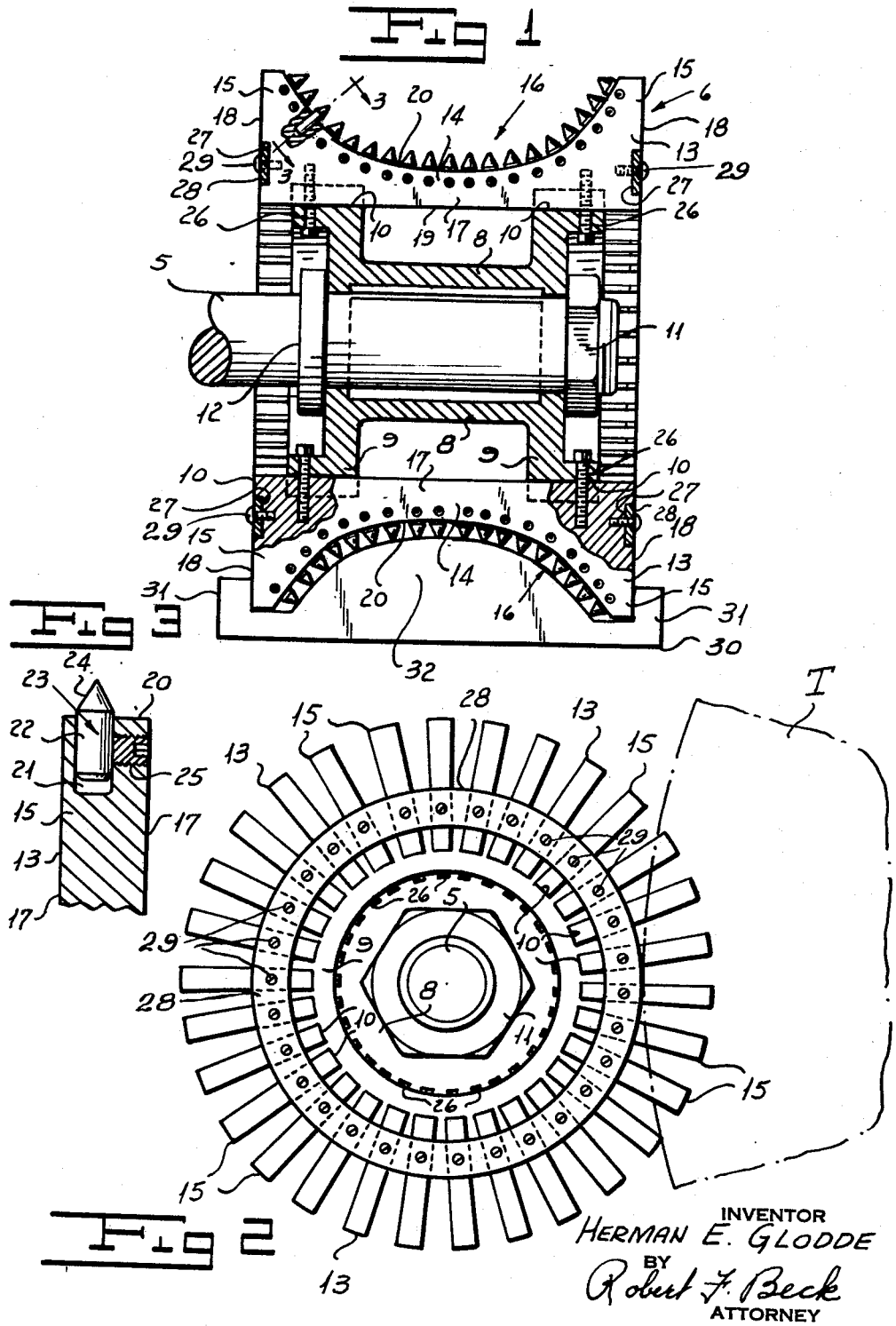
INVENTOR
HERMAN E. GLODDE
BY
Robert F. Beck
ATTORNEY

United States Patent Office 2,930,110
Patented Mar. 29, 1960

2,930,110

DETREADING MEANS

Herman E. Glodde, Eldred, N.Y.

Application January 24, 1958, Serial No. 710,907

4 Claims. (Cl. 29—78)

My invention relates to the retreading of tires and more particularly to means for effective removal of old treads and conditioning of the casings or carcasses for receiving new treads, this application being a continuation-in-part of my copending application Serial No. 543,537, filed October 28, 1955, now Patent No. 2,864,444, granted December 16, 1958.

One of the objects of my invention is to provide a detreading tool or means equipped with blades having teeth arranged in a manner to maximize the removal of the old tread of a tire casing during relative movement of the casing.

Another object of my invention is to provide a tool of the foregoing described character wherein the blades are so arranged as to permit shaping of the casing to conform to a pre-established transverse contour.

A further object of my invention is to provide a tread removing tool equipped with blades having shredding teeth which may be readily sharpened or replaced when the teeth become worn.

A still further object of my invention is to provide a tool of the foregoing described character equipped with means to prevent accidental displacement or detachment of the blades during operation of the tool whereby the operator is protected from injury.

An important object of my invention is to provide a tool of the foregoing described character wherein the teeth may be adjusted within the blades to conform to a pre-established projecting distance from the blades whereby uniformity of the transverse contour of the casings during tread removal and shaping thereof is obtained.

Another important object of my invention is to provide a tool of the foregoing described character which is simple in construction, durable in use, efficient in operation, and economical in manufacture.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

Figure 1 is a transverse sectional view, partly in elevation, of my invention;

Figure 2 is a side elevation thereof; and

Figure 3 is a detail sectional view taken on the line 3—3 of Figure 1.

In practicing my invention, as illustrated in the drawing, there is provided a rotatable work or drive shaft 5 on which my novel form of tool 6 is mounted for rotation therewith for detreading and conditioning a tire casing T disposed in radial and contactual relation with the tool, the casing being diagrammatically shown in broken lines. The tool 6 comprises a cylindrical hub 8 provided on its peripheral face with spaced circumferentially extending flanges 9 each formed with circumspaced longitudinally extending slots 10, the slots of one flange being aligned with the slots of the other flange. The hub is also provided with a bore in which is accommodated the work shaft 5, a suitable nut 11 being threaded on the end of the shaft and coacting with a collar 12 fixed thereto for maintaining the tool on the shaft in fixed and rotational relation therewith.

Disposed within the slots 10 are combs or shredding devices each comprising a guttered plate 13 formed with an intermediate web section 14 and spaced somewhat triangular-shaped end sections 15, the sections cooperating to define a channel or groove 16. When the plates 13 are assembled in the slots 10 of the hub 8, the faces of each plate constitute side, end, inner, and outer faces 17, 18, 19, and 20, respectively, with the outer face 20 being formed with sockets or openings 21 in which are disposed the cylindriform shanks 22 of spaced teeth 23 having conical outer ends 24. The teeth are maintained within the plates by screws 25 threaded into the plates and abutting against the teeth, removal or loosening of the screws permitting the teeth to be readily removed for sharpening and replaced when desired. The ends of the plates 13 have threaded therein, through their inner faces 19, screws 26 which extend through the flanges 9 of the hub 8 to thus bolt the plates to the hub for rotation therewith over a circular path.

The end faces 18 of the plates 13 are formed with circumferentially extending grooves 27 in which are disposed safety means or anchoring rings 28, one such ring being disposed on each side of the tool as clearly shown in Figure 1 and secured in the grooves by screws 29 extending through the ring and threaded into the plates. By thus providing the tool with the rings 28, accidental displacement or detachment of the plates is precluded during rotation of the tool thereby guarding the operator against injury.

It will be apparent, that by loosening the screws 25 the teeth 23 may be removed for replacement or sharpening and when initially inserted in the sockets 21 they are positioned therein as far as possible and the screws 25 tightened thereagainst. When the teeth are thus secured within the sockets, the respective plate 13 is disposed in a position wherein its inner face 19 constitutes the top thereof and with the corner portions of the face 20, adjacent the end faces 18, being disposed in engagement with the upper surface of a template 30 having side flanges 31 engaging the faces 18. The upper surface of the template 30 is provided with an upwardly extending portion 32 projecting into the channel 16 to define the projecting distance of the teeth 23 from the face 20. When the plate 13 and template 30 are thus correlated, the screws 25 are loosened to permit the outer ends of the teeth to engage the portion 32 whereupon the screws 25 are tightened to maintain the teeth in their thus adjusted positions for detreading operation.

Inasmuch as the teeth of each plate are disposed in longitudinal spaced alignment, the slots 9 may extend at an angle, for instance, 10°, to dispose the plates abaxially of the hub and thus stagger the teeth of each plate relative to those of the adjacent plates whereby to preclude any pronounced circumferential grooving of the casing during tread removal. The shape of each plate is substantially identical and is such that the teeth remove the tread from the casing to conform to a desired contour, it being understood that the channel 16, between the outer ends of the sections 15, is of a sufficient width to accommodate tires of various transverse sizes within a limited range and that the casing may be moved axially with respect to the tool to effect desired shaping of the casing and tread removal therefrom.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined solely to the use herein disclosed in connection therewith as it may be utilized for any purpose to which it is adaptable. It is, therefore, to be understood that the invention is not limited to the specific construction as illustrated and described, as the same is only illustrative of the principles involved which are capable of extended application in various forms, and the invention comprehends all construction within the scope of the appended claims.

What I claim is:

1. A rotary tool for removing a tread from a tire casing comprising, hub-like means adapted to be secured to a drive shaft for rotation therewith about an axis, teeth holders having end and intermediate sections and being removably secured to said hub-like means, said holders being each provided with an outer face formed with a longitudinally aligned row of spaced sockets, tread-removing teeth mounted in said sockets and extending outwardly from said face, the sockets of one holder being disposed in staggered relation with the sockets of adjacent holders to preclude circumferential ridging of the tread by the teeth during removal of the tread, the distance of the outer ends of the teeth of said end sections from said axis being progressively greater outwardly from the intermediate sections towards the ends of said holders to thus coact with the teeth of said intermediate sections to define a channel-like path about and within the confines of said tool during rotation thereof, and set-screws carried by said holders and securing said teeth fixed within said sockets and operable to permit individual movement of said teeth relative to said sockets for replacement and adjustment to define said path.

2. A rotary tool for removing a tread from a tire casing comprising, an elongated hub-like member adapted to be secured to a drive shaft for rotation therewith about an axis, said member being formed with a plurality of lengthwise-extending circumspaced slots, teeth holder plates within said slots having end and intermediate sections and being removably secured to said hub-like member, said plates being each provided with an outer face formed with a longitudinally aligned row of spaced sockets, tread-removing teeth mounted in said sockets and extending outwardly from said face, the sockets of one holder being disposed in staggered relation with the sockets of adjacent holders to preclude circumferential ridging of the tread by the teeth during removal of the tread, the distance of the outer ends of the teeth of said end sections from said axis being progressively greater outwardly from the intermediate sections towards the ends of said plates to thus coact with the teeth of said intermediate sections to define a channel-like path about and within the confines of said tool during rotation thereof, and set-screws carried by said plates and securing said teeth within said sockets and being operable to permit individual movement of said teeth relative to said sockets for replacement and adjustment to define said path.

3. A rotary tool for removing a tread from a tire casing comprising, an elongated hub-like member adapted to be secured to a drive shaft for rotation therewith about an axis, said member being formed with an intermediate body portion and end flanges extending about and outwardly from said body portion, said flanges being provided with a plurality of lengthwise-extending circumspaced slots, teeth holder plates within said slots having end and intermediate sections, screw means extending radially through said flanges and being threadedly connected to said plates to removably secure said plates to said hub-like member, said plates being each provided with an outer face formed with a longitudinally aligned row of spaced sockets, tread-removing teeth mounted in said sockets and extending outwardly from said face, the sockets of one holder being disposed in staggered relation with the sockets of adjacent holders to preclude circumferential ridging of the tread by the teeth during removal of the tread, the distance of the outer ends of the teeth of said end sections from said axis being progressively greater outwardly from the intermediate sections towards the ends of said plates to thus coact with the teeth of said intermediate sections to define a channel-like path about and within the confines of said tool during rotation thereof, and set-screws carried by said plates and securing said teeth within said sockets and being operable to permit individual movement of said teeth relative to said sockets for replacement and adjustment to define said path.

4. A rotary tool for removing a tread from a tire casing comprising, an elongated hub-like member adapted to be secured to a drive shaft for rotation therewith about an axis, said member being formed with a plurality of lengthwise-extending circumspaced slots, teeth holder plates within said slots, screw means removably securing said plates to said hub-like member, a safety ring rigidly connected to each end of each of said plates, said plates being each provided with an outer face formed with a longitudinally aligned row of spaced sockets, tread-removing teeth mounted in said sockets and extending outwardly from said face, the sockets of one holder being disposed in staggered relation with the sockets of adjacent holders to preclude circumferential ridging of the tread by the teeth during removal of the tread, the distance of the outer ends of the teeth of said end sections from said axis being progressively greater outwardly from the intermediate sections towards the ends of said plates to thus coact with the teeth of said intermediate sections to define a channel-like path about and within the confines of said tool during rotation thereof, and set-screws carried by said plates and securing said teeth within said sockets and being operable to permit individual movement of said teeth relative to said sockets for replacement and adjustment to define said path.

References Cited in the file of this patent

UNITED STATES PATENTS

| | | |
|---|---|---|
| 1,017,774 | Leavitt | Feb. 20, 1912 |
| 1,395,309 | Taber et al. | Nov. 1, 1921 |
| 1,498,935 | Shull | June 24, 1924 |
| 1,971,428 | Riordan | Aug. 28, 1934 |
| 2,035,802 | George | Mar. 31, 1936 |
| 2,121,202 | Killgore | June 28, 1938 |
| 2,243,707 | James | May 27, 1941 |
| 2,265,643 | Heath | Dec. 9, 1941 |
| 2,504,219 | Norden | Apr. 18, 1950 |
| 2,578,997 | Errig et al. | Dec. 18, 1951 |